United States Patent [19]

Carver

[11] Patent Number: 4,500,986
[45] Date of Patent: Feb. 19, 1985

[54] ASYMMETRICAL TIME DIVISION MATRIX APPARATUS

[75] Inventor: John H. Carver, Cedar Rapids, Iowa

[73] Assignee: Rockwell International Corporation, El Segundo, Calif.

[21] Appl. No.: 462,297

[22] Filed: Jan. 31, 1983

[51] Int. Cl.[3] ............................................. H04J 3/04
[52] U.S. Cl. ........................................ 370/58; 370/59
[58] Field of Search .................... 370/64, 66, 58, 59, 370/91

[56] References Cited

U.S. PATENT DOCUMENTS 3,458,658  7/1969  Aro ........................................ 370/58
3,562,431  2/1971  Inose .................................... 370/58
4,093,827  6/1978  Charransol et al. ................... 370/66
4,392,221  7/1983  Hesketh ................................. 370/64
4,430,733  2/1984  Hardy et al. .......................... 370/66
4,450,557  5/1984  Munter .................................. 370/64

Primary Examiner—Douglas W. Olms
Assistant Examiner—Curtis Kuntz
Attorney, Agent, or Firm—Bruce C. Lutz; Carmen B. Patti; H. Fredrick Hamann

[57] ABSTRACT

Asymmetrical time division multiplex switch for use in a nonblocking switch matrix. This design reduces parts required to configure the switch matrix since the prior art typically uses symmetrical switches wherein one of the inputs and outputs of a plurality of switches are connected in parallel to perform the total switch matrix function. The asymmetrical design reduces parts count and accordingly increases reliability of the total device.

3 Claims, 6 Drawing Figures

ASYMMETRICAL TIME DIVISION MATRIX APPARATUS

THE INVENTION

The present invention is generally related to electronics and more specifically related to time division multiplex switching. Even more specifically, the present invention is related to a nonblocking switch matrix utilizing asymmetrical switches for accomplishing the time division multiplex switching required in such a nonblocking switch matrix.

The prior art is replete with various types of switch matrices and a good example of a nonblocking switch matrix accomplishing the same end result as the present invention is illustrated in U.S. Pat. No. 4,093,827, invented by Charransol, et al. This approach to nonblocking switch matrices utilizes symmetrical time division multiplex switches wherein the inputs and outputs of various symmetrical blocks are connected in parallel. However, the design of two complementary asymmetrical switches, as presented by the present invention, provides a switch which, through a reduction in circuitry to perform the switching function of previously paralleled units, provides a more reliable product.

It is, therefore, an object of the present invention to provide an improved time division multiplex switch for use in a nonblocking switch matrix.

Other objects and advantages of the present invention may be ascertained from a reading of the specification and appended claims in conjunction with the drawings wherein:

DETAILED DESCRIPTION

Figure 1:
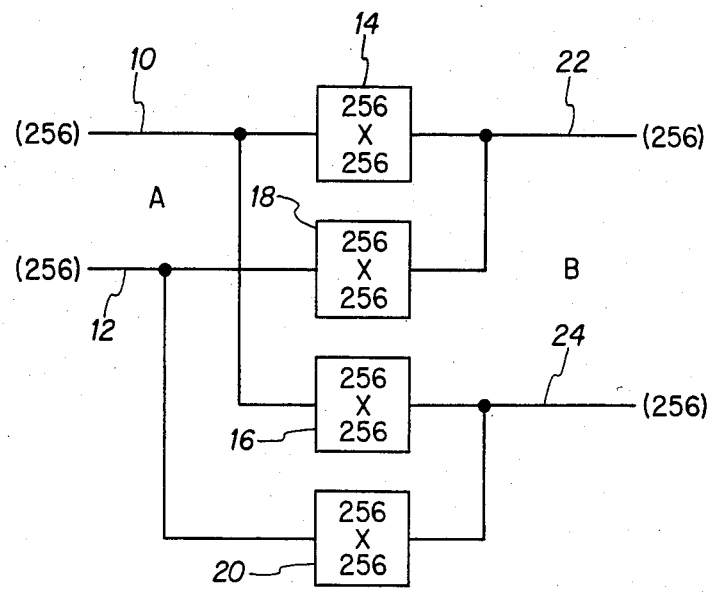
FIG. 1 is a block diagram illustration of a prior art nonblocking switch matrix using symmetrical TDM switching modules.

In FIG. 1, a pair of input lines 10 and 12 each supply eight parallel lines of serial time multiplexed data wherein each line contains 32 time multiplexed data streams for a total of 256 data channels. The line 10 is supplied to symmetrical 256×256 switching modules 14 and 16 while line 12 is supplied to similar modules 18 and 20. The output of modules 14 and 18 are connected in parallel to form eight output lines designated as 22 while the output of modules 16 and 20 are connected in parallel to form eight lines designated as 24.

Figure 2:
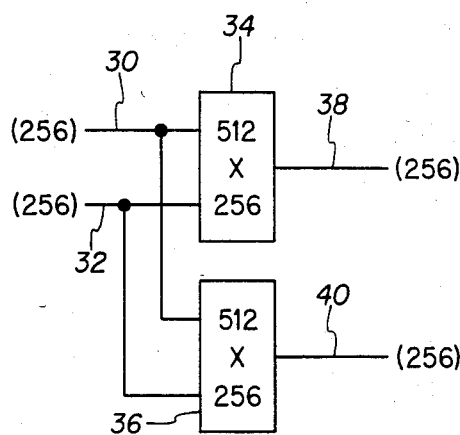
FIG. 2 is a block diagram of the present invention using asymmetrical 512×256 modules to accomplish the switching objective of FIG. 1.

In FIG. 2, two sets of eight time multiplexed input data lines 30 and 32 are each supplied to the asymmetrical 512×256 channel switching modules 34 and 36. The output of module 34 is an eight line set of leads designated as 38 while the output of module 36 is a similar set of leads designated as 40.

Figure 3:
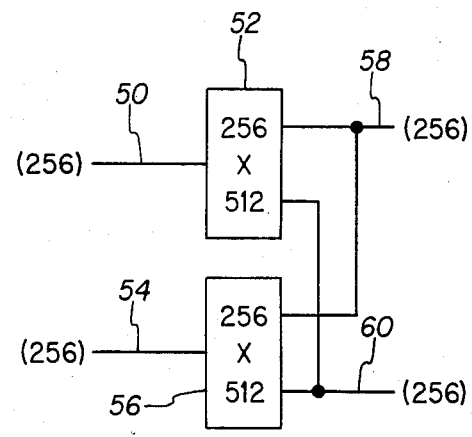
FIG. 3 is a block diagram of asymmetrical 256×512 modules designed somewhat differently than those in FIG. 2 to accomplish the same end result as is accomplished in FIGS. 1 or 2.

In FIG. 3, a set of eight lines 50 is supplied to an asymmetrical 256×512 channel asymmetrical module 52 while a set of leads 54 is supplied to an asymmetrical 256×512 channel module 56. Eight leads of each of the modules 52 and 56 are connected in parallel to form one 256 channel set of output leads 58 while the remaining eight output leads of each of the modules 52 and 56 are connected in parallel to form the remaining output set of leads 60.

Figure 4:
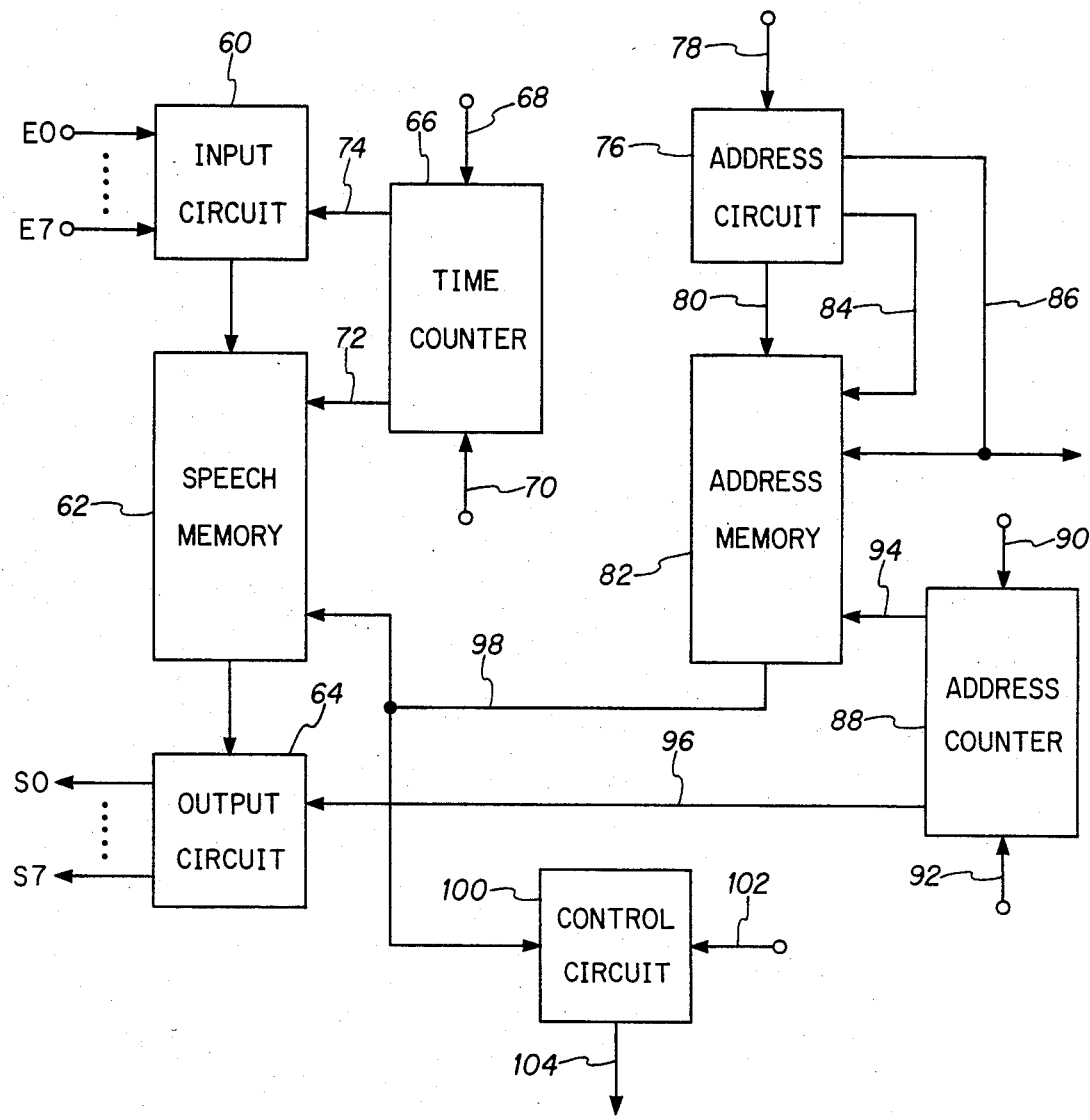
FIG. 4 is a block diagram of a prior art symmetrical module of the type used in FIG. 1.

In prior art FIG. 4, a set of leads from E0 to E7 are supplied to an input "series to parallel" circuit 60 which supplies output leads in parallel on eight lines to a speech memory block 62. The output of the speech memory block 62 is supplied on eight parallel lines to an output parallel to serial converting block 64. A time counter 66 receives a clock input on a lead 68 and further synchronizing signals on a lead 70. The time counter 66 has eight leads designated as 72 supplying address signals to the speech memory 62. Three of the least significant of the leads 72 are redesignated as 74 and supply addressing signals to the input circuit 60. A further address circuit 76 has serial control data inputs on 78 and supplies eight parallel bits of data on a set of leads 80 to an address memory 82. Eight more lines 84 supply address information to address memory 82 and finally a read/write control lead 86 is supplied to the address memory 82. An address counter 88 receives a clock input signal on a lead 90 and a synchronizing signal on lead 92 and outputs eight parallel addressing signals on a set of leads 94, three of which are duplicated on a set of leads 96 to output circuit 64. The address memory 82 has a set of eight output leads 98 which supply signals to the speech memory 62 and to a control circuit 100 which has another input lead 102 and an output lead 104. Control lead 102 contains the same control signals as does 86 and may be physically connected to same.

Figure 5:
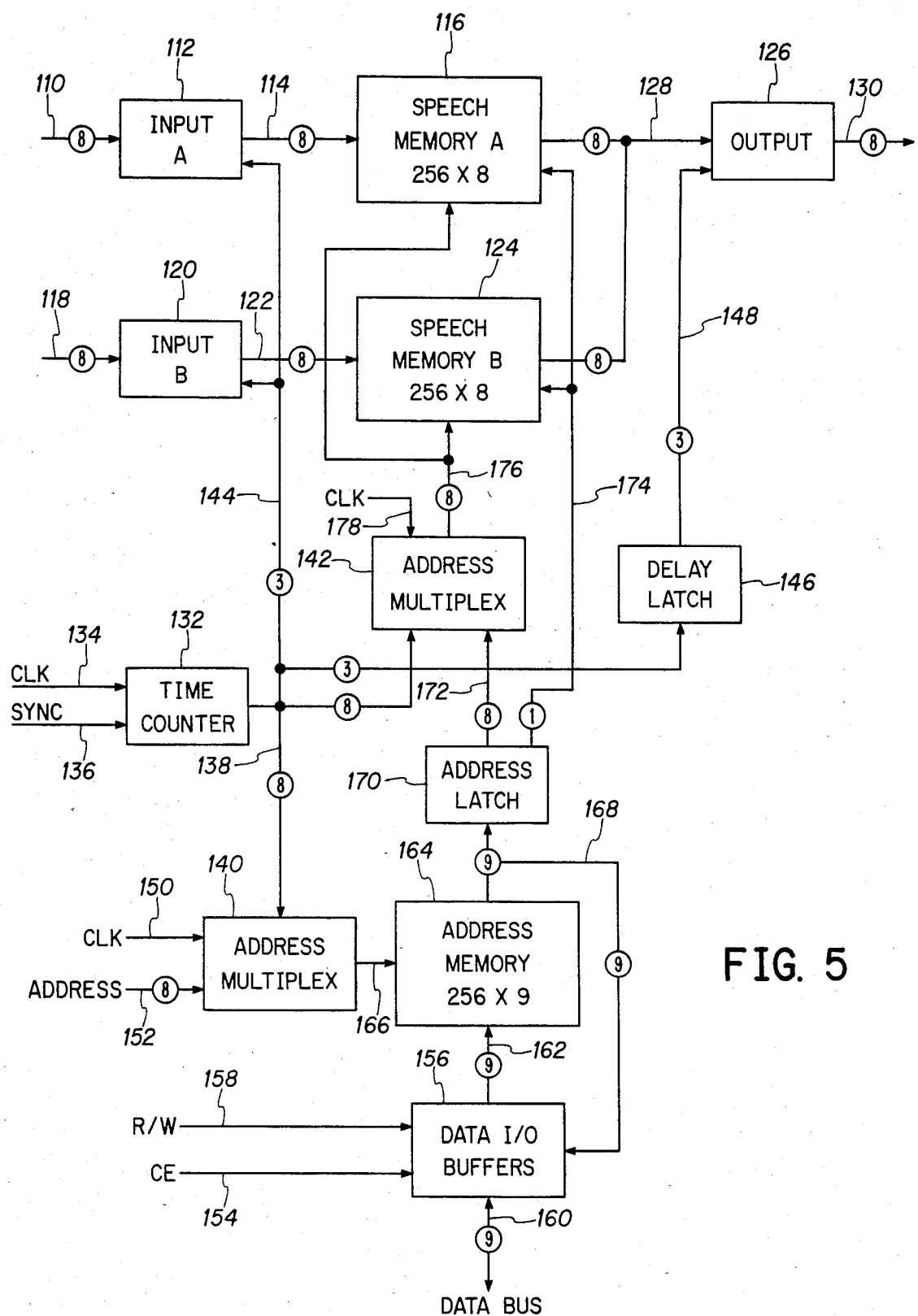
FIG. 5 is a detailed block diagram of an asymmetrical module of the type used in FIG. 2.

In FIG. 5, eight parallel lines, generally designated as 110, supply serial time multiplexed input signals to input "block A" 112 which then supplies eight bits of parallel information on a set of leads 114 to a speech memory block A designated as 116 which is a 256×8 bit addressable RAM memory. A second set of eight leads generally designated as 118 supplies input signals to an input block 120 which, like block 112, provides serial to parallel conversion of the signals. A set of eight output leads generally designated as 122 supplies signals from block 120 to a speech memory B block 124 which is similar to block 116. Each of the blocks 116 and 124 have eight parallel output leads which supply signals to a parallel to serial output block 126 on a set of leads 126. The block 128 converts the parallel inputs to eight serial time multiplexed outputs on a set of leads 130. A time counter block 132 has clock and sync input signal leads 134 and 136 respectively, and a set of output leads generally designated as 138. All eight of these leads 138 are supplied to an address multiplex block 140 and to an address multiplex block 142. Signals from the three least significant of the eight leads are supplied to inputs of blocks 112 and 120 on a set of leads designated as 144 and these same three leads are also supplied to a delay latch block 146. An output of the delay latch supplies these signals delayed in time on a set of leads 148 to the output block 126. The address multiplex block 140 has clock input signals on a lead 150 and eight parallel address bits input on a set of leads 152. A chip enable lead (CE) 154 and a read/write lead 158 supply control signals to the data buffer 156. Nine data bus leads 160 supply data to the I/O buffer 156 and these signals are output from buffer 156 on a set of nine parallel leads 162 to an address memory block 164 comprising a 256×9 bit addressable RAM memory. The address multiplex block 140 supplies signals on a set of leads 166 to control the operation of block 164. Nine parallel output leads are supplied on a set of leads 168 from address memory 164 to an address latch 170 as well as being returned to the data I/O buffer 156 so that the contents of address memory 164 can be read as well as written. The nine data bits from the address memory are divided in address latch 170 and eight of these bits are supplied on a set of leads 172 to the address multiplex block 142 and the remaining (most significant) bit is supplied on a lead 174 to control which one of the two blocks 116 and 124 is operational to pass data to output block 126. These addressing input bits are passed through the address multiplex 142 and output on a set of leads 176 as controlled by a clock input supplied on a lead 178 to address multiplex 142. The polarity or logic value of clock 178 controls which one of the two addresses received from time counter 132 and from address latch 170 is passed through the address multiplex block 142.

Figure 6:
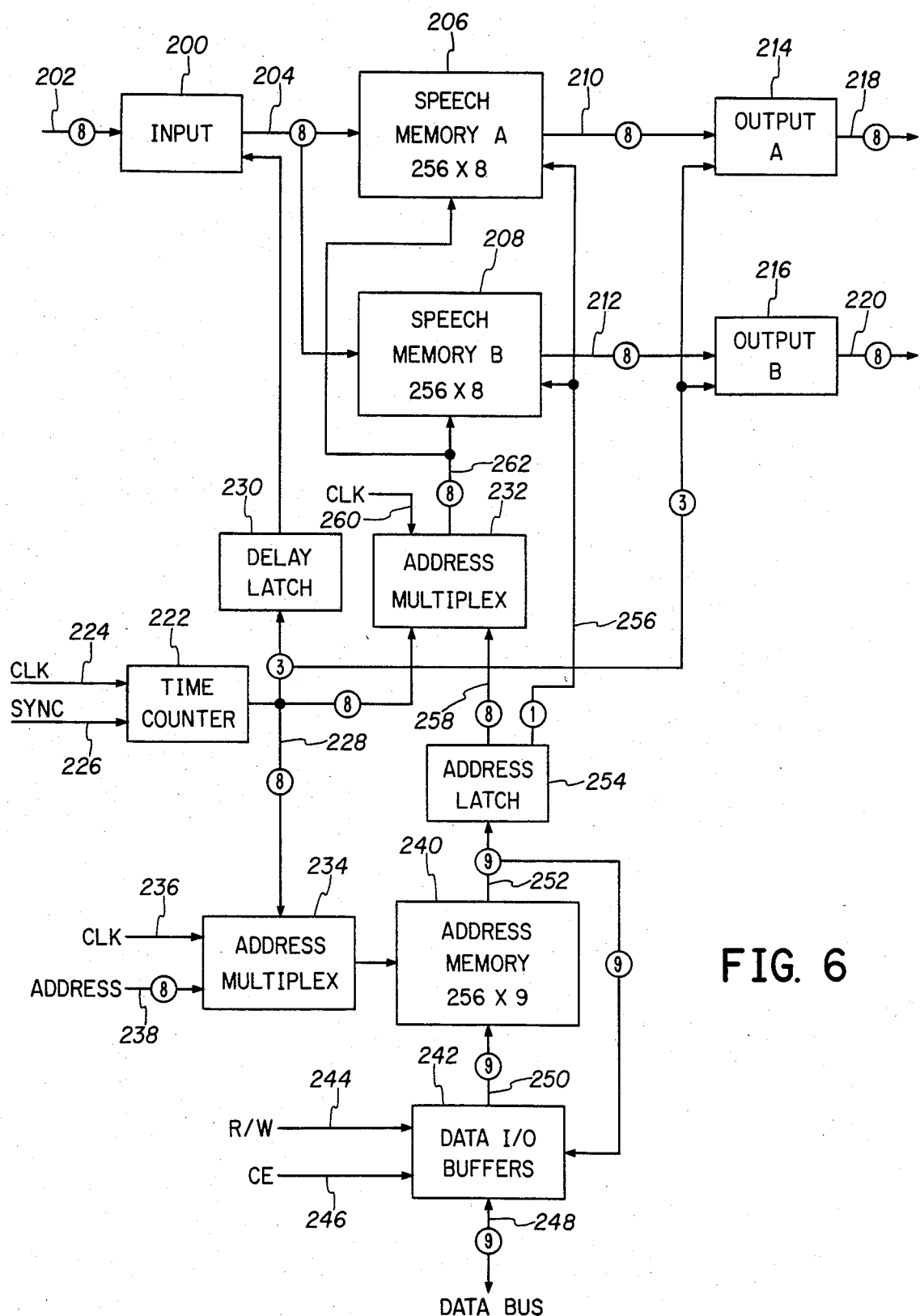
FIG. 6 is a detailed block diagram of an asymmetrical module of the type used in FIG. 3.

In FIG. 6, a serial to parallel block 200 receives eight parallel input signals in time multiplexed format on a set of leads 202. The signals, after being converted to parallel format, are output on a set of leads 204 to a speech memory A block 206 and a speech memory B block 208. These blocks are similar to 116 and 124 of FIG. 5. These two blocks output signals on leads 210 and 212 to parallel to serial converting blocks 214 and 216, respectively, which have outputs 218 and 220, respectively. A time counter 222 which has clock and sync inputs 224 and 226 supplies output signals on eight leads generally designated as 228 in a manner similar to that of FIG. 5 to a delay latch 230, the blocks 216 and 214, an address multiplex block 232 and to an address multiplex block 234. Address multiplex block 234 receives clock and address signals on leads 236 and 238 and outputs signals to an address memory block 240. A data I/O buffer 242 receives a read/write signal on a lead 244 and chip enable (CE) signal on lead 246. A set of nine leads generally designated as 248 connects the I/O buffer 242 to a data bus. A further set of leads 250 supplies signals from the buffer 242 to the address memory 240. A set of leads 252 supply nine parallel bits of information from the address memory block 240 to an address latch 254 as well as returning the same information to the I/O buffer 242 for return to the data bus. A single bit of the nine bits as received by address latch 254 is output on a lead 256 to control the operation of memories 206 and 208 while the remaining bits are output on a set of leads 258 to the address multiplex block 232. A clock signal 260 controls which of the two addresses received from time counter 222 and from address latch 254 is passed through the address multiplex 232 on a set of leads 262 to address the memory blocks 206 and 208.

OPERATION

Although the operation of nonblocking switches is well-known as a general concept, and is explained in detail in the above referenced Charransol, et al., patent, a few comments will be provided. A nonblocking switch by definition is designed so that any input signal can be output to any time or space channel at the output of the switch. In fact, all input signal channels can be simultaneously output to respective switched positions in a "nonblocking" switch network.

FIG. 1 illustrates a 512×512 channel nonblocking switch. The first set of 256 channels comprising eight leads each having 32 time division multiplexed channels is input on the set of leads 10. This set of signals is provided to blocks 14 and 16 so that they can be output on either of the sets of channels 22 and 24 each of which are sets of eight space channels (cables or wires) each comprising 32 time multiplexed channels. The same operation is performed with the 256 channels input on the set of leads 12 since they are supplied to switching blocks 18 and 20. As will be noted, the outputs of the two switching blocks 14 and 18 are combined in parallel with respective space channels being connected together. If the size of the total switch is expanded, the number of switching blocks such as 14 increases as an exponential of the number of sets of inputs.

Since the output of the blocks such as 14 and 18 are combined as a parallel set 22 anyway, the present invention is based on the elimination of certain common parts found within the symmetrical modules such as 14. As can readily be seen from FIG. 2, conceptually the solution is to use a 512×256 nonsymmetrical or asymmetrical block to receive all of the input signals of the system and output these signals on a single set of leads such as 38. The same would hold true for each of the other asymmetrical sections. The signals are only connected in parallel at one place and although maybe not obvious from looking at FIG. 1, FIG. 3 accomplishes the same end result by inputting the signals into the switch and then outputting them in an asymmetrical fashion as shown. The overall function of the switch of FIG. 3 is identical with that of FIG. 2 and the overall "black box" switching result is identical to that of FIG. 1.

FIG. 4 shows more detail as to the internal operation of a prior art symmetrical switch where each of the space inputs E0 through E7 are supplied to a series to parallel circuit 60 where there would be eight registers which can be addressed so as to output the signal held in the selected register to the speech memory block 62. The time counter 66 addresses these eight registers in a sequential fashion for each of the 32 time channels of input information and the cycle is continuously repeated so that this information is supplied, in parallel, to speech memory 62. The time counter 66 is also addressing speech memory 62 in a time sequential manner so that the data supplied by block 60 is sequentially input into the 8×256 memory block of memory 62. A time multiplexed set of addresses are input from the circuitry to the right wherein the memory locations are addressed and output to the parallel to series circuit 64 at times wherein both time and space multiplexing will occur on outputs S0 through S7 in accordance with the sequential serial addressing of the eight registers in block 64 by address counter 88.

In FIG. 5 the two sets of eight parallel input signals are each put into separate series to parallel converting blocks or buffers 112 and 120 where they are temporarily stored before being sequentially addressed by time counter 132 on addressing lines 144. Upon being addressed, the contents of the registers within these input blocks 112 and 120 are supplied to the speech memories 116 and 124. This operation is substantially identical to that found in the prior art. However, a single time counter 132 is utilized for the two series to parallel buffers as well as for the output thus already saving a time counter as compared to the same capability of the prior art. The addressing circuit is time multiplexed in a manner somewhat similar to that of the prior art except that in order to address either speech memory 116 or 124, a ninth bit is utilized in the address latch as a select feature. Thus, duplication of the address multiplex, the data I/O buffer and the address latch is eliminated and the address memory is 256×9 bits rather than having two 256×8 bit memories. Finally, since these signals are combined before being converted to a set of serial outputs in block 126, a parallel to serial converter 126 is eliminated in providing the combined functions in the prior art of blocks 14 and 18 in FIG. 1. It should be understood that the clock signals supplied to time counter 132 and address multiplex blocks 140 and 142 may be derived from the same source. Although not explicitly shown, a clock signal is also supplied to each of the blocks in FIG. 5 for the purpose of synchronizing the internal operation of the blocks and the transfer of information between blocks.

A switched connection from an input channel to an output channel is established by writing the input channel number (0 to 511) into the address memory location corresponding to the desired output channel (0 to 255). Any input channel can be connected to any output channel subject to the restriction that an output channel can be connected to only one input channel at a given moment. A given input channel can, however, be connected to more than one output channel.

FIG. 6 operates in a very similar manner and is believed fairly obvious from an observation of FIG. 3. However, it may be stated that the set of inputs is supplied to the series to parallel converter 200 which in a time sequential manner supplies these signals to both of the speech memory blocks 206 and 208. The address scheme is again somewhat similar to that of FIG. 5 except that a ninth bit of the address memory is used to specify which of the two speech memory blocks 206 and 208 is to receive the parallel signals from input block 200. The input signals are stored in one of the 256 memory locations, within the selected memory block, which is selected by the remaining eight addrress bits from address memory 240. The contents of speech memory A 206 and speech memory B 208 are read out sequentially and sent to output parallel to serial converting blocks 214 and 216, respectively.

A switched connection from an input channel to an output channel is established by writing the output channel number (0 to 511) into the address memory location corresponding to the desired input channel (0 to 255). Any input channel can be connected to any output channel subject to the restrictions that an output channel can be connected to only one input channel at a given moment and that an input channel can be connected to one and only one output channel. Note that this is sufficient to meet the requirements for a nonblocking switch matrix.

Although the final FIG. 6 looks like a mirror image of FIG. 5, the simplification shown required many iterations of design before ascertaining that the combination could eliminate so many parts. The apparatus of FIG. 5 provides a sequential write, random read operation while FIG. 6 provides a random write and sequential read operation.

While I have shown the present invention utilizing only two asymmetrical blocks to perform the nonblocking switch operation, it will be realized that the asymmetrical modules can be designed to any asymmetrical size in accordance with the limitations of technology and the attendant savings in parts count to produce the total nonblocking switch.

Therefore, I wish to be limited only by the scope of the invention as defined in the appended claims wherein I claim:

1. Time division multiplex apparatus having time and space switching capability comprising, in combination:
   first means for supplying N signal groups each signal group having M sets of time division multiplexed signals where N and M are both integers greater than 1;
   signal memory second means including input means, output means and addressing control means having first and second (N * M) signal storage location sets where "*" is a multiplication symbol;
   sequential addressing third means for providing sequentially occurring and repeating first address signals;
   input buffer serial to parallel fourth means, connected to said first, second and third means, for supplying signals as received from said first means to said first and second signal storage locations of said second means at times determined by addressing signals received from said third means;
   fifth means for supplying second address signals;
   address memory sixth means, including address signal input means, control means and output means, for storing (N * M) signal addresses wherein each signal address is (K+1) bits in length, where K is equal to $\log_2$ (N * M), at storage locations determined by signals applied at said control means thereof;
   address memory multiplex seventh means, including clock input means, first and second address signal input and signal output means, and connected to said third, fifth and sixth means for supplying read and write addresses to said sixth means in accordance with clock signals supplied to said clock input means;
   signal memory multiplex eighth means, including clock means, first and second address signal input means and signal output means, connected to said second, third and sixth means, for passing K addressing bits from said third and sixth means to each of said first and second signal storage location sets of said means;
   ninth means connecting said sixth means to said second means for supplying the remaining addressing bit of said (K+1) bits in said sixth means to said first and second signal storage location sets in said second means;
   parallel to serial output tenth means, including signal input, control input and N output means, connected to said second and third means for converting parallel signals from said first storage location set of said second means to serial output signals at one of said N output means in accordance with address signals received at said control means thereof from said third means; and
   parallel to serial output eleventh means, including signal input, control input and N output means, connected to said second and third means for converting parallel signals from said second storage location set of said second means to serial output signals at one of said N output means in accordance with address signals received at said control means thereof from said third means.

2. Time division multiplex apparatus having time and space switching capability comprising, in combination:

first means for supplying two sets of N signal groups each signal group having M sets of time division multiplexed signals where N and M are both integers greater than 1;

signal memory second means including input means, output means and addressing control means having first and second (N * M) signal storage location sets where "*" is a multiplication symbol;

sequential addressing third means for providing sequentially occurring and repeating first address signals;

input buffer serial to parallel fourth means, connected to said first, second and third means, for supplying signals as received from said first means to said first and second signal storage locations of said second means at times determined by addressing signals received from said third means;

fifth means for supplying second address signals;

address memory sixth means, including address signal input means, control means and output means, for storing (N * M) signal addresses wherein each signal address is (K+1) bits in length, where K is equal to $\log_2$ (N * M), at storage locations determined by signals applied at said control means thereof;

address memory multiplex seventh means, including clock input means, first and second address signal input and signal output means, and connected to said third, fifth and sixth means for supplying read and write addresses to said sixth means in accordance with clock signals supplied to said clock input means;

signal memory multiplex eighth means, including clock means, first and second address signal input means and signal output means, connected to said second, third and sixth means, for passing K addressing bits from said third and sixth means to each of said first and second signal storage location sets of said second means;

ninth means connecting said sixth means to said second means for supplying the remaining addressing bit of said (K+1) bits in said sixth means to said first and second signal storage location sets in said second means; and parallel to serial output tenth means, including signal input, control input and N output means, connected to said second and third means for converting parallel signals from each of said first and second storage location sets of said second means to serial output signals at one of said N output means in accordance with address signals received at said control means thereof from said third means.

3. Time division multiplex apparatus having time and space switching capability comprising, in combination:

first means for supplying two sets of signal groups each signal group having time division multiplexed signals;

signal memory second means including input means, output means and addressing control means having first and second signal storage location sets;

sequential addressing third means for providing sequentially occurring first address signals;

input buffer fourth means, connected to said first, second and third means, for supplying signals as received from said first means to said first and second signal storage locations of said second means at times determined by addressing signals received from said third means;

fifth means for supplying second address signals;

address memory sixth means, including address signal input means, control means and output means, for storing signal addresses at storage locations determined by signals applied at said control means thereof;

address memory multiplex seventh means, including clock input means, first and second address signal input and signal output means, and connected to said third, fifth and sixth means for supplying read and write addresses to said sixth means in accordance with clock signals supplied to said clock input means;

signal memory multiplex eighth means, including clock input means, first and second address signal input means and signal output means, connected to said second, third and sixth means, for passing addresses from said third and sixth means to each of said first and second signal storage location sets of said second means;

ninth means connecting said sixth means to said second means for supplying a remaining addressing bit of the bits received from said sixth means to said first and second signal storage location sets in said second means; and parallel to serial output tenth means, including signal input, control input and output means, connected to said second and third means for converting parallel signals from each of said first and second storage location sets of said second means to serial output signals at one of said output means in accordance with address signals received at said control means thereof from said third means.

* * * * *